(12) United States Patent
Yang et al.

(10) Patent No.: US 9,592,745 B2
(45) Date of Patent: *Mar. 14, 2017

(54) LARGE ELECTRIC VEHICLE POWER STRUCTURE AND ALTERNATING-HIBERNATION BATTERY MANAGEMENT AND CONTROL METHOD THEREOF

(71) Applicant: Aleees Eco Ark Co. Ltd., Bade (TW)

(72) Inventors: An-Tao Anthony Yang, Bade (TW); Gordon Ching Chen, Bade (TW)

(73) Assignee: ALEEES ECO ARK (CAYMAN) CO. LTD., Crand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/888,379

(22) PCT Filed: Apr. 30, 2014

(86) PCT No.: PCT/CN2014/076659
§ 371 (c)(1),
(2) Date: Oct. 30, 2015

(87) PCT Pub. No.: WO2014/177062
PCT Pub. Date: Nov. 6, 2014

(65) Prior Publication Data
US 2016/0082859 A1    Mar. 24, 2016

Related U.S. Application Data

(60) Provisional application No. 61/817,619, filed on Apr. 30, 2013.

(51) Int. Cl.
*B60L 11/18*   (2006.01)
*H01M 10/42*   (2006.01)
*H01M 10/48*   (2006.01)

(52) U.S. Cl.
CPC ....... *B60L 11/1866* (2013.01); *B60L 11/1855* (2013.01); *B60L 11/1861* (2013.01);
(Continued)

(58) Field of Classification Search
CPC ............. B60L 11/1861; B60L 11/1866; B60L 11/1855; H01M 10/425; H01M 10/482;
(Continued)

(56) References Cited

U.S. PATENT DOCUMENTS

2009/0063067 A1   3/2009  Sekizaki et al.
2010/0085015 A1*  4/2010  Hamaguchi ....... H01M 10/0525
                                                        320/134
(Continued)

FOREIGN PATENT DOCUMENTS

CN     101065876 A    10/2007
CN     101504444 A    8/2009
(Continued)

*Primary Examiner* — Marthe Marc-Coleman
(74) *Attorney, Agent, or Firm* — Kirton McConkie; Evan R. Witt (57) ABSTRACT

An alternating-hibernation battery management and control method for a power structure of a large electric vehicle is provided. The power structure includes a vehicular computer with a sorting controller, plural configuration-variable series-type battery boxes in parallel connection and a driving device. Each configuration-variable series-type battery box includes plural battery modules in series connection. The method includes the following steps. Firstly, the vehicular computer calculates a required number of battery modules and a required number of configuration-variable series-type battery boxes. Then, the sorting controller calculates module scores of all battery modules, and generates a battery module sorting result. Then, the sorting controller enables the required number of battery modules according to the required number of battery modules and the battery module sorting result. Then, the sorting controller calculates a bat-
(Continued)

tery box score and generates a battery box sorting result. Afterwards, the sorting controller controls at least one configuration-variable series-type battery box in the last rank of the battery box sorting result to be in a hibernation mode.

23 Claims, 3 Drawing Sheets

(52) U.S. Cl.
CPC ....... *H01M 10/425* (2013.01); *H01M 10/482* (2013.01); *H01M 2010/4271* (2013.01); *H01M 2220/20* (2013.01); *Y02T 10/7005* (2013.01); *Y02T 10/705* (2013.01); *Y02T 10/7044* (2013.01); *Y02T 10/7258* (2013.01); *Y02T 10/92* (2013.01)

(58) Field of Classification Search
CPC ...... H01M 2210/4271; H01M 2220/20; Y02T 10/7044; Y02T 10/7005; Y02T 10/705; Y02T 10/92; Y02T 10/7258
USPC ............. 701/22; 307/10.7; 320/116; 319/139
See application file for complete search history.

(56) References Cited

U.S. PATENT DOCUMENTS

2011/0140662 A1* 6/2011 Li .................... H02J 7/0016
                                                    320/116
2011/0273023 A1   11/2011  Nishida et al.
2013/0002016 A1    1/2013  Furukawa et al.

FOREIGN PATENT DOCUMENTS

| CN | 201812895 U | 4/2011 |
| CN | 102208821 A | 10/2011 |
| CN | 102376988 A | 3/2012 |
| JP | S52145734 A | 12/1977 |
| JP | H06336380 A | 12/1994 |
| JP | H11299122 A | 10/1999 |
| JP | 2003243042 A | 8/2003 |
| JP | 2007311256 A | 11/2007 |
| JP | 2012034439 A | 2/2012 |
| JP | 2013031281 A1 | 2/2013 |
| JP | 2014514899 A | 6/2014 |
| JP | 2013501488 A1 | 1/2016 |
| KR | 10-2005-0048278 A1 | 5/2005 |
| KR | 10-2005-0097491 A1 | 10/2005 |
| KR | 10-2006-0084846 A1 | 7/2006 |
| KR | 10-2013-0001239 A1 | 1/2013 |
| TW | 201121189 A | 6/2011 |
| TW | 201236313 A | 9/2012 |
| WO | 2008105063 A1 | 9/2008 |
| WO | 2012123815 A1 | 9/2012 |
| WO | 2013014930 A1 | 1/2013 |

* cited by examiner

LARGE ELECTRIC VEHICLE POWER STRUCTURE AND ALTERNATING-HIBERNATION BATTERY MANAGEMENT AND CONTROL METHOD THEREOF

FIELD OF THE INVENTION

The present invention relates to a large electric vehicle power structure and an alternating-hibernation battery management and control method thereof, and more particularly to a large electric vehicle power structure and a control method using a computing process to obtain a battery module sorting result and a battery box sorting result and using an alternating-hibernation process to dynamically balance the stored energy.

BACKGROUND OF THE INVENTION

In recent years, oil and energy shortages cause the rising oil prices. Moreover, since the global warming phenomenon does not relieve, the reduction of carbon emissions is the policy of the governments around the world. However, since most of the today's large vehicles use oil as the power source, the exhausted waste gas causes the air pollution problems. Although a small portion of large vehicles uses batteries as the power source, the use of electricity as the power source has many difficulties to be overcome. For example, it is critical to balance the stored energy of plural batteries in order to avoid the over-discharging problem. As known, the over-discharging problem may shorten the use life of the battery.

Moreover, because of the demands on power and endurance, the large electric vehicle uses a great number of battery modules in serial connection and parallel connection so as to acquire high voltage and high current. In case that the battery modules are connected with each other in series, the battery modules have the same discharging current. That is, the serially-connected battery modules in a battery box usually have matched electric properties. Consequently, the discharging conditions of these battery modules are very similar. If the electric properties of these battery modules do not match each other, the electric energy of some of the battery modules is possibly exhausted, and the exhausted battery modules are possibly damaged because of the over-discharging problem. However, the process of allowing the electric properties of the serially-connected battery modules in the battery box to match each other is time-consuming and costly. Since the fabricating process of the battery module is largely prolonged and the product price is increased, the competitiveness of the product is impaired.

In case that the power structure of the electric vehicle comprises plural batteries in parallel connection, the power structure can normally work when one battery is damaged. However, since different battery modules have different electric properties, the electric energy of some of the battery modules is exhausted earlier. The exhausted battery modules enter a low voltage protection state. Under this circumstance, the output current of the power structure is reduced and the endurance of the electric vehicle is obviously lowered.

Therefore, there is a need of providing a power structure of a large electric vehicle and a control method thereof in order to overcome the above drawbacks.

SUMMARY OF THE INVENTION

An object of the present invention provides a large electric vehicle power structure and an alternating-hibernation battery management and control method in order to balance the charged energy of all battery modules. Moreover, the utilization of the battery module and the endurance of the large electric vehicle are increased to the largest extent.

Another object of the present invention provides a large electric vehicle power structure and an alternating-hibernation battery management and control method. By performing a battery box alternating-hibernation sorting process and recombining the internal series connection configuration of the configuration-variable series-type battery boxes, the discharging conditions of all battery modules are adjustable. Moreover, even if the battery modules are suffered from battery degradation and the stored energy difference is very large, the discharging conditions of all battery modules are adjusted according to the real-time dynamic information about the sorting result. Consequently, while the electric vehicle is driven, the residual electric energy quantities of all battery boxes of the power structure are substantially equal and the residual electric energy quantities of the battery modules in each battery box are substantially equal. Ideally, when the electric vehicle is returned to the charging station to be charged, the residual electric energy quantities of all battery modules are equal.

Another object of the present invention provides a large electric vehicle power structure and an alternating-hibernation battery management and control method. By performing a battery box alternating-hibernation sorting process and recombining the internal series connection configuration of the configuration-variable series-type battery boxes, the voltage of the battery module of any battery box will not be too low to enter the over-discharge protection state.

In accordance with an aspect of the present invention, there is provided an alternating-hibernation battery management and control method for a power structure of a large electric vehicle. The power structure includes a vehicular computer with a sorting controller, plural configuration-variable series-type battery boxes in parallel connection and a driving device. Each of the plural configuration-variable series-type battery boxes includes plural battery modules in series connection. The alternating-hibernation battery management and control method includes the following steps. In a step (a), the vehicular computer calculates a required number of battery modules and a required number of configuration-variable series-type battery boxes according to a vehicle-driving demand of the driving device. In a step (b), the sorting controller calculates module scores of all battery modules, and generates a battery module sorting result of each configuration-variable series-type battery box. In a step (c), the sorting controller enables the required number of battery modules in each configuration-variable series-type battery box according to the required number of battery modules and the battery module sorting result of each configuration-variable series-type battery box. In a step (d), the sorting controller calculates a battery box score of each configuration-variable series-type battery box according to the module scores of the enabled battery modules in each configuration-variable series-type battery box, and generates a battery box sorting result according to the battery box score. In a step (e), the sorting controller controls at least one configuration-variable series-type battery box in the last rank of the battery box sorting result to be in a hibernation mode.

In accordance with another aspect of the present invention, there is provided an alternating-hibernation battery management and control method for a power structure of a large electric vehicle. The large electric vehicle power structure includes plural configuration-variable series-type battery boxes in parallel connection. Each of the plural configuration-variable series-type battery boxes includes plural battery modules in series connection. The alternating-hibernation battery management and control method includes the following steps. Firstly, a battery module sorting process is performed for sorting the battery modules of each configuration-variable series-type battery box to obtain a battery module sorting result and allowing at least one battery module in the last rank of the battery module sorting result to be in a hibernation mode. Then, a battery box sorting process is performed for sorting the plural configuration-variable series-type battery boxes to obtain a battery box sorting result and allowing at least one configuration-variable series-type battery box in the last rank of the battery box sorting result to be in the hibernation mode.

In accordance with another aspect of the present invention, there is provided a power structure of a large electric vehicle. The power structure includes plural configuration-variable series-type battery boxes, a driving device and a vehicular computer. The plural configuration-variable series-type battery boxes are connected with each other in parallel. Each of the plural configuration-variable series-type battery boxes includes plural battery modules. The plural battery modules are connected with each other in series. The driving device is connected with the plural configuration-variable series-type battery boxes. The driving device includes a motor for driving the large electric vehicle and a motor drive for driving the motor. The vehicular computer is connected with the plural configuration-variable series-type battery boxes for detecting a vehicle-driving demand of the driving device and calculating a required number of battery modules and a required number of configuration-variable series-type battery boxes. The vehicular computer further includes a sorting controller for performing a battery box alternating-hibernation sorting process. While the battery box alternating-hibernation sorting process is performed, the battery modules of each configuration-variable series-type battery box are sorted to obtain a battery module sorting result, the required number of battery modules are enabled according to the battery module sorting result, the plural configuration-variable series-type battery boxes are sorted to obtain a battery box sorting result, and at least one configuration-variable series-type battery box in the last rank of the battery box sorting result is controlled to be in the hibernation mode.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
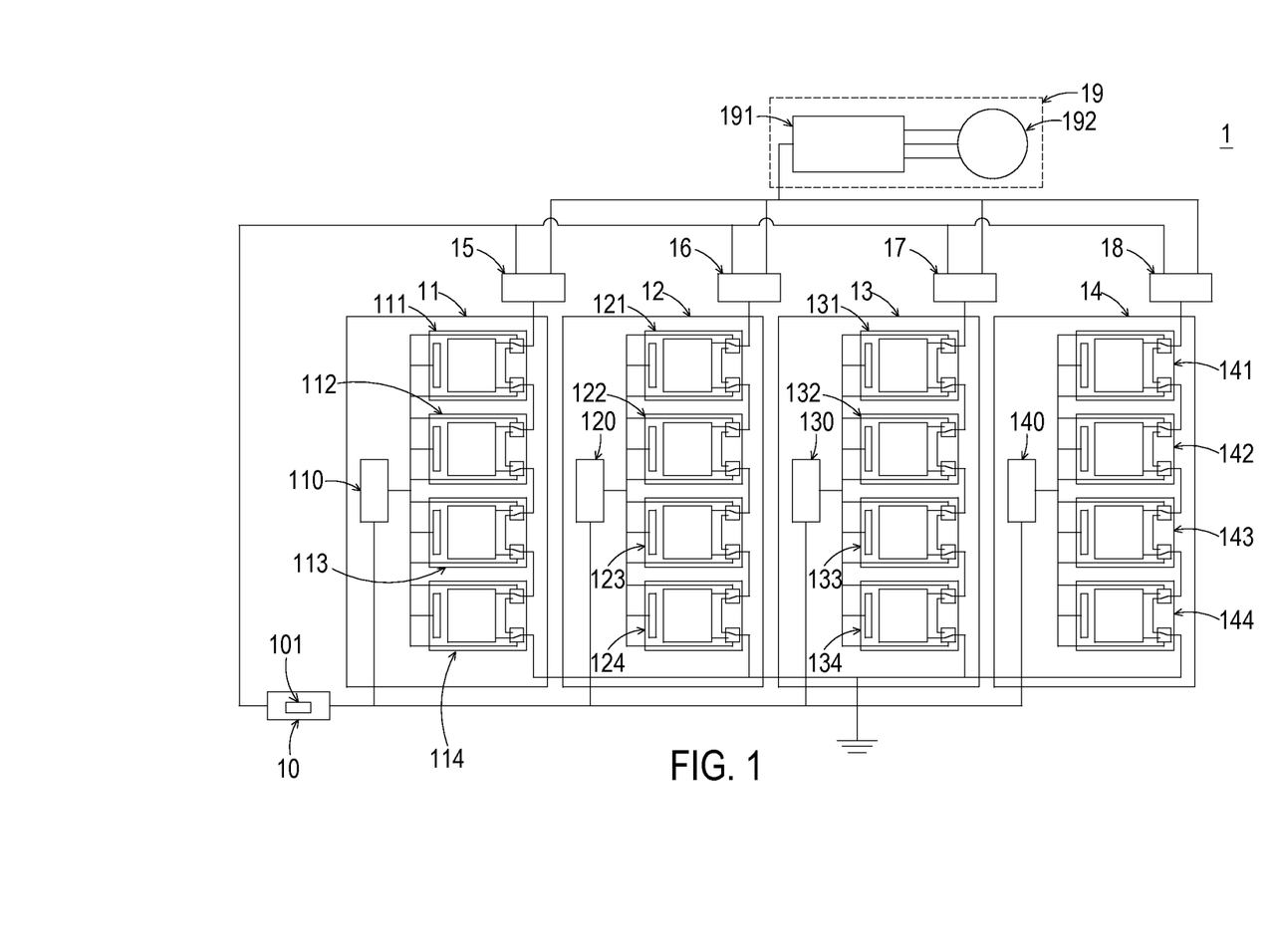
FIG. 1 is a schematic functional block diagram illustrating the architecture of a large electric vehicle power structure according to an embodiment of the present invention.

FIG. 1 is a schematic functional block diagram illustrating the architecture of a large electric vehicle power structure according to an embodiment of the present invention. An example of the large electric vehicle includes but is not limited to an electric bus or an electric truck. As shown in FIG. 1, the power structure 1 comprises a vehicular computer 10, plural configuration-variable series-type battery boxes 11~14, plural power transistors 15~18 and a driving device 19. The vehicular computer 10 further comprises a sorting controller 101. In this embodiment, the number of the configuration-variable series-type battery boxes is four. It is noted that the number of the configuration-variable series-type battery boxes is not restricted. The number of the power transistors is identical to the number of the configuration-variable series-type battery boxes. In this embodiment, the four configuration-variable series-type battery boxes comprises a first configuration-variable series-type battery box 11, a second configuration-variable series-type battery box 12, a third configuration-variable series-type battery box 13 and a fourth configuration-variable series-type battery box 14. Each of these configuration-variable series-type battery boxes comprises a battery box monitoring board and plural battery modules. In this embodiment, each configuration-variable series-type battery box comprises four battery modules. It is noted that the number of the battery modules is not restricted. For example, the first configuration-variable series-type battery box 11 comprises a first battery box monitoring board 110 and four battery modules 111~114. These four battery modules comprise a first battery module 111 of the first battery box, a second battery module 112 of the first battery box, a third battery module 113 of the first battery box and a fourth battery module 114 of the first battery box.

Similarly, as shown in FIG. 1, the second configuration-variable series-type battery box 12, the third configuration-variable series-type battery box 13 and the fourth configuration-variable series-type battery box 14 have the same architectures as the first configuration-variable series-type battery box 11. The second configuration-variable series-type battery box 12 comprises a second battery box monitoring board 120 and four battery modules 121~424. These four battery modules comprise a first battery module 121 of the second battery box, a second battery module 122 of the second battery box, a third battery module 123 of the second battery box and a fourth battery module 124 of the second battery box. The third configuration-variable series-type battery box 13 comprises a third battery box monitoring board 130 and four battery modules 131~134. These four battery modules comprise a first battery module 131 of the third battery box, a second battery module 132 of the third battery box, a third battery module 133 of the third battery box and a fourth battery module 134 of the third battery box. The fourth configuration-variable series-type battery box 14 comprises a fourth battery box monitoring board 140 and four battery modules 141~144. These four battery modules comprise a first battery module 141 of the fourth battery box, a second battery module 142 of the fourth battery box, a third battery module 143 of the fourth battery box and a fourth battery module 144 of the fourth battery box.

In this embodiment, the power transistors corresponding to the plural configuration-variable series-type battery boxes comprise a first power transistor 15, a second power transistor 16, a third power transistor 17 and a fourth power transistor 18. The first power transistor 15, the second power transistor 16, the third power transistor 17 and the fourth power transistor 18 are connected with the first configuration-variable series-type battery box 11, the second configuration-variable series-type battery box 12, the third configuration-variable series-type battery box 13 and the fourth configuration-variable series-type battery box 14, respectively. The driving device 19 comprises a driving device 191 and a motor 192. The driving device 191 is connected with the first power transistor 15, the second power transistor 16, the third power transistor 17 and the fourth power transistor 18. Consequently, the driving device 191 can receive electric energy from the first configuration-variable series-type battery box 11, the second configuration-variable series-type battery box 12, the third configuration-variable series-type battery box 13 and the fourth configuration-variable series-type battery box 14 to drive operations of the motor 192.

Figure 2:
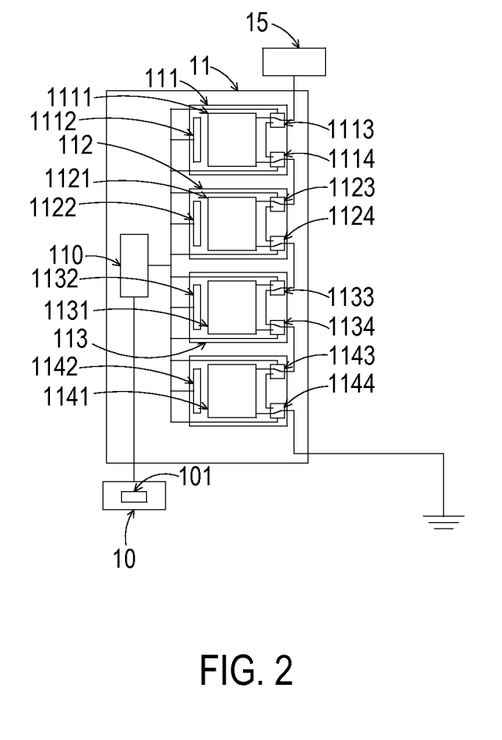
FIG. 2 schematically illustrates the detailed structure of the first configuration-variable series-type battery box.

FIG. 2 schematically illustrates the detailed structure of the first configuration-variable series-type battery box. Since the battery modules of all configuration-variable series-type battery boxes have the same structures, only the battery modules of the first configuration-variable series-type battery box 11 will be described as an example. As shown in FIG. 2, the first battery module 111 of the first battery box comprises a first battery core string 1111, a first battery module monitoring board 1112, a first positive relay 1113 and a first negative relay 1114. The second battery module 112 of the first battery box comprises a second battery core string 1121, a second battery module monitoring board 1122, a second positive relay 1123 and a second negative relay 1124. The third battery module 113 of the first battery box comprises a third battery core string 1131, a third battery module monitoring board 1132, a third positive relay 1133 and a third negative relay 1134. The fourth battery module 114 of the first battery box comprises a fourth battery core string 1141, a fourth battery module monitoring board 1142, a fourth positive relay 1143 and a fourth negative relay 1144. The rest may be deduced by analogy. That is, the second configuration-variable series-type battery box 12, the third configuration-variable series-type battery box 13 and the fourth configuration-variable series-type battery box 14 have the similar structures. Each battery module monitoring board will transmit the state of charge (SOC), the state of health (SOH), the battery core temperature and associated information to the vehicular computer 10. According to the information, the sorting controller 101 uses a battery module sequencing means to perform a battery module sequencing process and uses a battery box sequencing means to perform a battery box sequencing process.

Please refer to FIG. 1 again. The power supply loops of the configuration-variable series-type battery boxes are connected with each other in parallel through the corresponding power transistors. Consequently, a power structure with four configuration-variable series-type battery boxes is formed to provide electric energy to the motor drive 192. The first power transistor 15 is connected with the first configuration-variable series-type battery box 11 in series. The second power transistor 16 is connected with the second configuration-variable series-type battery box 12 in series. The third power transistor 17 is connected with the third configuration-variable series-type battery box 13 in series. The fourth power transistor 18 is connected with the fourth configuration-variable series-type battery box 14 in series. The first power transistor 15 and the first configuration-variable series-type battery box 11 in serial connection, the second power transistor 16 and the second configuration-variable series-type battery box 12 in serial connection, the third power transistor 17 and the third configuration-variable series-type battery box 13 in serial connection and the fourth power transistor 18 and the fourth configuration-variable series-type battery box 14 in serial connection are connected between the vehicular computer 10 and the driving device 19 in parallel. The battery modules of each configuration-variable series-type battery box are connected with each other in series through the corresponding relays. Moreover, an end of the battery box monitoring board of each configuration-variable series-type battery box is connected with the battery module monitoring boards of the corresponding battery modules, and another end of the battery box monitoring board of each configuration-variable series-type battery box is connected with the vehicular computer 10. Moreover, the vehicular computer 10 is also connected with the first power transistor 15, the second power transistor 16, the third power transistor 17 and the fourth power transistor 18.

Please refer to FIG. 2 again. Take the first configuration-variable series-type battery box 11 as an example. In the battery modules 111~114, a bypass loop (unnumbered) is arranged between the relays of each battery module. The relays of the battery modules 111~114 are controlled by the battery module monitoring boards of the corresponding battery modules. Under control of the battery module monitoring boards, the relays of the battery modules 111~114 are selectively connected to the battery core strings of the corresponding battery modules or the bypass loops (unnumbered) of the corresponding battery modules. Moreover, the battery module monitoring boards of these battery modules are controlled by the sorting controller 101 according to a battery box alternating-hibernation sorting algorithm. Since the bypass loops are selectively connected with the relays, the configuration-variable series-type battery boxes of the power structure 1 can recombine the internal series connection configuration. Moreover, according to the command from the sorting controller 101, the relays of the battery modules are selectively connected with the four battery modules in series. Consequently, the corresponding battery modules are switched between a power supply mode and a hibernation mode. That is, the battery modules can be added to or disconnected from the power supply loop of the corresponding configuration-variable series-type battery box. Moreover, the sorting controller 101 can control the operations of the power transistors individually. Since each power transistor can be individually disconnected with the power supply loop of the corresponding configuration-variable series-type battery box, the on/off states of the configuration-variable series-type battery box are adjusted according to the on/off states of the corresponding power transistor. Consequently, the priorities of the configuration-variable series-type battery boxes to provide the electric energy can be determined according to the command from the vehicular computer 10.

Figure 3:
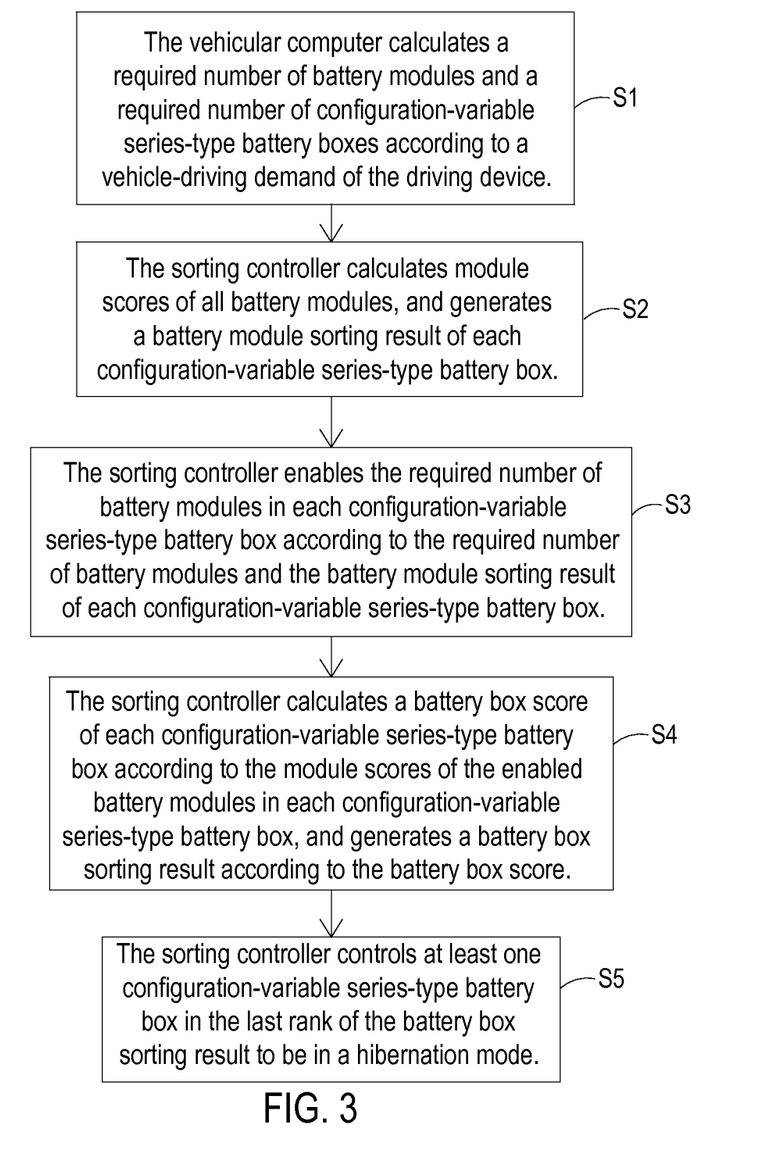
FIG. 3 illustrates a flowchart of an alternating-hibernation battery management and control method according to an embodiment of the present invention.

FIG. 3 illustrates a flowchart of an alternating-hibernation battery management and control method for a large electric vehicle power structure according to an embodiment of the present invention. In a step S1, the vehicular computer 10 detects or forecasts a target motor speed of the electric vehicle. Since the motor speed is in a proportion to the driving voltage of the motor 192, the vehicular computer 10 can forecast the subsequent motor speed range according to the record of the vehicle speed and the response of the acceleration pedal while driving the electric vehicle. According to the forecasted motor speed range, the vehicular computer 10 determines a target motor speed range. Consequently, a DC bus voltage of the motor drive 191 of the power structure 1 is adjusted to comply with the optimized setting of the target motor speed range. According to this setting, the duty cycle of each power transistor is not too short or too long and is close to the ideal duty cycle when the power structure 1 provides the electric energy to the motor drive 191. Moreover, the DC bus voltage of the motor drive 191 is related to the number of serially-connected battery modules of the four configuration-variable series-type battery boxes 11~14 in the power supply mode. Consequently, in the step S1, the required DC bus voltage range is calculated according to the proportional relation between the motor speed and the required voltage, and the required number N of battery modules is calculated according to the required DC bus voltage range.

On the other hand, the vehicular computer 10 also detects or forecasts a target motor torque of the electric vehicle. Since the accelerating capability of the motor of the electric vehicle is dependent on the magnitude of the current, the current of the motor drive 191 to drive the motor 192 is limited by the number of the parallel-connected configuration-variable series-type battery boxes. Consequently, the vehicular computer 10 calculates the accelerating capability of the motor (i.e., the target motor torque). According to the target motor torque, the vehicular computer 10 calculates the driving current range of the motor drive 191 and sets the required number C of configuration-variable series-type battery boxes in the subsequent accelerating or decelerating task.

After the required number C of the configuration-variable series-type battery boxes is calculated, the vehicular computer 10 judges whether all of the configuration-variable series-type battery boxes need to be enabled. If the judging condition is satisfied, all of the configuration-variable series-type battery boxes are enabled to provide the electric energy. Whereas, if the judging condition is not satisfied, the subsequent steps of the alternating-hibernation battery management and control method are continuously performed.

In the step S2, the sorting controller 101 calculates a corresponding module score of each battery module according to the state of charge, the state of health and the battery core temperature of each battery module, which are obtained by the vehicular computer 10. Then, the battery modules of each configuration-variable series-type battery box are sorted according to the rank of the module scores, and thus a battery module sorting result is obtained. Moreover, the module score is defined according to a mathematic formula containing the state of charge, the state of health and/or the temperature information of each battery module. Preferably but not exclusively, the mathematic formula may be expressed as follows.

$$\text{module score} = SOC - (\text{battery core temperature} \times \text{compensation coefficient}) \quad \text{Formula 1}$$

$$\text{module score} = (SOC \times \text{battery life reduction coefficient}) - (\text{battery core temperature} \times \text{compensation coefficient}) \quad \text{Formula 2}$$

$$\text{module score} = (SOC \times SOH) - (\text{battery core temperature} \times \text{temperature rise compensation coefficient}) \quad \text{Formula 3}$$

$$\text{module score} = SOC - ((\text{battery core temperature} - \text{air temperature}) \times \text{temperature rise compensation coefficient}) \quad \text{Formula 4}$$

$$\text{module score} = SOC - ((\text{battery core temperature} - \text{battery box internal temperature}) \times \text{compensation coefficient}) \quad \text{Formula 5}$$

$$\text{module score} = SOC - ((\text{battery core temperature} - \text{ideal battery core temperature}) \times \text{temperature rise compensation coefficient}) \quad \text{Formula 6}$$

$$\text{module score} = SOC - ((\text{battery core temperature} - \text{average battery core temperature of all modules}) \times \text{temperature rise compensation coefficient}) \quad \text{Formula 7}$$

$$\text{module score} = (SOC \times SOH) - \text{temperature rise compensation coefficient} \times (\text{battery core temperature} - \int ((\text{battery discharge quantity} \times \text{heat loss proportion coefficient}) - (\text{heat dissipation coefficient}) \times (\text{battery temperature} - \text{battery box internal temperature}))) \quad \text{Formula 8}$$

$$\text{module score} = (SOC \times SOH) - (\text{temperature rise compensation coefficient} \times (\text{battery core temperature} - \text{evaluated battery temperature}))^2 \quad \text{Formula 9}$$

In the above mathematic formulae, (SOC×SOH) is an approach of calculating the real internal electric capacity of the battery module. That is, (SOC×SOH) is the product of the state of charge (SOC) and the state of health (SOH). In the formula 7 and the formula 8, the sorting controller 101 judges whether the temperature rise of the battery module is abnormal. Generally, the battery module whose battery core temperature is abnormally high has a lower module score than the battery module whose battery core temperature is normal. Moreover, if the battery core temperatures of some battery modules are nearly equal, the battery module with higher electric capacity has the priority to provide the electric energy (i.e., has the higher module score). From the above mathematic formulae, it is found that the module score of the battery module is positively related to the state of charge (SOC), related to the temperature rise curve of the battery module, and negatively related to the battery core temperature of the battery module.

After the step S2, a step S3 is performed. That is, after the sorting controller 101 sorts the battery modules of each configuration-variable series-type battery box, the sorting controller 101 will select N battery modules with the highest module scores according to the battery module sorting result and the required number N of battery modules calculated in the step S1. Moreover, the relays of these selected battery modules are controlled by the battery module monitoring boards of the corresponding battery modules. Consequently, the relays of these selected battery modules are connected with the battery core strings of the corresponding battery modules. In such way, the selected battery modules are added to the power supply loop of the corresponding configuration-variable series-type battery box, and the power supply voltage is adjusted. Moreover, according to a command from the sorting controller 101 to the battery module monitoring boards of the unselected battery modules, the relays of the unselected battery modules will be connected to the bypass loop. Consequently, the unselected battery modules are disconnected from the power supply loop of the corresponding configuration-variable series-type battery box so as to be in the hibernation mode.

After the step S3, a step S4 is performed. After the battery modules of each configuration-variable series-type battery box are enabled according to the battery module sorting result and the required number N of battery modules, the sorting controller 101 will accumulate the module scores of the enabled battery modules of each configuration-variable series-type battery box. The accumulated result of the module scores is defined as a battery box score of the corresponding configuration-variable series-type battery box. Then, a battery box sorting result is obtained according to the battery box scores of the configuration-variable series-type battery boxes.

After the step S4, a step S5 is performed. That is, after the sorting controller 101 obtains the battery box sorting result about the configuration-variable series-type battery boxes, the sorting controller 101 will select C battery boxes according to the battery box sorting result and the required number C of battery boxes calculated in the step S1. Moreover, the power transistors corresponding to the selected battery boxes are controlled by the sorting controller 101. Consequently, the configuration-variable series-type battery boxes with the highest scores are connected with the driving device 19 through the corresponding power transistors so as to construct a power structure complying with the vehicle-driving demand. Moreover, the power transistors corresponding to the disabled configuration-variable series-type battery boxes (i.e., with the lowest battery box scores) are also controlled by the sorting controller 101. Consequently, the disabled configuration-variable series-type battery boxes are disconnected with the driving device 19, and the disabled configuration-variable series-type battery boxes are in the hibernation mode. In accordance with the alternating-hibernation battery management and control method of the present invention, the configuration-variable series-type battery boxes with the lowest battery box scores have the priorities to stop providing electric energy. Consequently, the overall stored energy of the battery modules of each configuration-variable series-type battery box can be balanced. Moreover, since the configuration-variable series-type battery box with the lowest battery box scores are disabled, the over-heating or over-discharging problem will be eliminated.

Moreover, after the step S5, the alternating-hibernation battery management and control method of the large electric vehicle power structure further comprises a real-time dynamic update step so as to trigger an alternating-hibernation switching process of re-determining the configuration-variable series-type battery boxes to be in the hibernation mode. In other words, after the step S5 is completed, the vehicular computer 10 continuously and dynamically gather statistics about the battery module sorting result and the battery box sorting result so as to re-determine the configuration-variable series-type battery boxes to be in the hibernation mode. There are various examples of triggering the alternating-hibernation switching process. In an embodiment, the alternating-hibernation switching process is triggered at a predetermined time interval. For example, the configuration-variable series-type battery boxes to be in the hibernation mode are re-determined at the predetermined time interval (e.g., 30 seconds) according to the above method.

In another embodiment, the alternating-hibernation switching process is triggered according to the change amount of the battery box score. For example, if the battery box score is changed and thus the battery box sorting result is changed, the configuration-variable series-type battery box to be in the hibernation mode is re-determined. In another embodiment, a score difference threshold value is set. Whenever the power structure 1 determines the configuration-variable series-type battery box to be in the hibernation mode, the circuitry of the power structure 1 kept unchanged. However, if the score different between the battery box score of the configuration-variable series-type battery box in the hibernation mode (i.e., the battery box score of the configuration-variable series-type battery box in the last rank of the previous battery box sorting result) and the battery box score of the configuration-variable series-type battery box in the last rank of the dynamically-obtained battery box sorting result reaches the score difference threshold value, the configuration-variable series-type battery box in the last rank of the dynamically-obtained battery box sorting result is switched to the hibernation mode and the configuration-variable series-type battery box originally in the hibernation mode is switched to the power supply mode. For example, if (the battery box score in the last rank of the previous battery box sorting result−the battery box score in the last rank of the current battery box sorting result)≥the score difference threshold value, the configuration-variable series-type battery box in the last rank of the current battery box sorting result is switched to the hibernation mode. Consequently, the purpose of dynamically updating the battery box sorting result can be achieved.

In another embodiment, the alternating-hibernation switching process is triggered according to the change amount of the battery box score. That is, the power structure 1 of the present invention can not only dynamically update the battery box sorting result but also determine the battery module sorting result according to the dynamically-calculated module scores. Moreover, the battery box sorting result is also dynamically changed according to module scores. In another embodiment, the alternating-hibernation switching process is triggered according to the change amount of the vehicle-driving demand. For example, if the vehicle-driving demand is changed and thus the required number N of battery modules and the required number C of battery boxes are changed, the configuration-variable series-type battery box to be in the hibernation mode is re-determined.

From the above descriptions, the alternating-hibernation battery management and control method of the present invention allows the residual electric energy quantities of all configuration-variable series-type battery boxes of the power structure to be as close as possible. Since the battery modules in the same configuration-variable series-type battery box have the approximately identical state of charge, the state of charge for any battery module will be too low to enter the over-discharge protection state. That is, each battery module can provide the enough power supply voltage. Moreover, by the method and the power structure of the present invention, the use lives of the battery modules and the configuration-variable series-type battery boxes will be largely prolonged.

Hereinafter, the operations of the alternating-hibernation battery management and control method of the present invention will be illustrated with reference to the following Table 1. In Table 1, the first configuration-variable series-type battery box is abbreviated to Battery box 1, the second configuration-variable series-type battery box is abbreviated to Battery box 2, the third configuration-variable series-type battery box is abbreviated to Battery box 3, and the fourth configuration-variable series-type battery box is abbreviated to Battery box 4. Moreover, the first battery module, the second battery module, the third battery module and the fourth battery module of each configuration-variable series-type battery box are abbreviated to Module 1, Module 2, Module 3 and Module 4, respectively. According to the calculating result of the step S1, the required number N of battery modules and the required number C of configuration-variable series-type battery boxes are both 3. Then, in the step S2, the module scores are calculated and sorted. For example, the module scores of module 1, module 2, module 3 and module 4 of the Battery box 1 are 40, 38, 30 and 32, respectively. Consequently, the battery module sorting result indicates that the ranks of module 1, module 2, module 3 and module 4 of the Battery box 1 are 1, 2, 4 and 3, respectively. The rest may be deduced by analogy. Similarly, the module scores of Battery boxes 2~4 are also calculated and sorted, and thus their battery module sorting results are listed in Table 1. After the battery module sorting results of all battery boxes are obtained, the step S3 is performed. That is, the sorting controller enables N battery modules according to the required number N of battery modules and the battery module sorting results. Please refer to Table 1 again. In Battery box 1, module 1, module 2 and module 4 are connected with the battery core strings through the corresponding relays so as to be in the power supply mode, and module 3 is connected to the bypass loop through the corresponding relays so as to be in the hibernation mode. Similarly, module 2, module 3 and module 1 in Battery box 2 are connected with the battery core strings through the corresponding relays so as to be in the power supply mode, and module 4 is connected to the bypass loop through the corresponding relays so as to be in the hibernation mode. Similarly, module 4, module 1 and module 3 in Battery box 3 are connected with the battery core strings through the corresponding relays so as to be in the power supply mode, and module 2 is connected to the bypass loop through the corresponding relays so as to be in the hibernation mode. Similarly, module 1, module 3 and module 2 in Battery box 4 are connected with the battery core strings through the corresponding relays so as to be in the power supply mode, and module 4 is connected to the bypass loop through the corresponding relays so as to be in the hibernation mode.

After the battery modules of all battery boxes are enabled according to the battery module sorting results, the step S4 is performed. That is, the sorting controller calculates the battery box scores of the corresponding battery box according to the module scores of the enabled battery modules and thus generates a battery box sorting result. In this embodiment, the score of Battery box 1 is equal to the total score of module 1, module 2 and module 4 (i.e., score=110), the score of Battery box 2 is equal to the total score of module 2, module 3 and module 1 (i.e., score=112), the score of Battery box 3 is equal to the total score of module 4, module 1 and module 3 (i.e., score=109), and the score of Battery box 4 is equal to the total score of module 1, module 3 and module 2 (i.e., score=111). According to the battery box scores, the battery box sorting result indicates that the scores of Battery 2, Battery 4, Battery 1 and Battery 3 are in a descending order. That is, Battery box 3 is the battery box with the lowest battery box score. Consequently, in the step S5, at least one configuration-variable series-type battery box with the lowest battery box score is controlled to be in the hibernation mode. In this embodiment, Battery box 3 is in the hibernation mode under control of the sorting controller, and the other battery boxes are in the normal power supply mode. Consequently, the purpose of balancing the overall stored energy and extending the battery life can be achieved.

TABLE 1

| | N = 3, C = 3 | | | | | | | |
|---|---|---|---|---|---|---|---|---|
| | Battery Box 1 | Battery module sorting result of battery box 1 | Battery Box 2 | Battery module sorting result of battery box 2 | Battery Box 3 | Battery module sorting result of battery box 3 | Battery Box 4 | Battery module sorting result of battery box 4 |
| Module 1 | score: 40 | 1 | score: 36 | 3 | score: 38 | 2 | score: 38 | 1 |
| Module2 | score: 38 | 2 | score: 38 | 1 | score: 31 | 4 | score: 36 | 3 |
| Module 3 | score: 30 | 4 | score: 38 | 1 | score: 32 | 3 | score: 37 | 2 |
| Module 4 | score: 32 | 3 | score: 35 | 4 | score: 39 | 1 | score: 35 | 4 |
| Total battery box score | score: 40 + 38 + 32 = 110 (module 1 + module 2 + module 4) | | score: 38 + 38 + 36 = 112 (module 2 + module 3 + module 1) | | score: 39 + 38 + 32 = 109 (module 4 + module 1 + module 3) | | score: 38 + 37 + 36 = 111 (module 1 + module 3 + module 2) | |
| Battery box sorting result | 3 | | 1 | | 4 | | 2 | |

From the above discussions, the present invention provides a large electric vehicle power structure and an alternating-hibernation battery management. As previously described, if the battery modules are suffered from battery degradation to different extents, the power consumption quantities of the battery modules are different. Under this circumstance, since some battery modules of a battery box have much residual electric energy and some battery modules of the battery box enter the over-discharging protection mode, the use lives of the battery modules and the battery box are shortened. The power structure and the method of the present invention can effectively solve the above drawbacks. Moreover, in the mathematic formulae of calculating the scores, the temperature rise compensation coefficient is taken into consideration. Since the battery module with high temperature has the lower priority to provide electric energy, the overall performance of the power structure is not adversely affected by the temperature. Moreover, since the charged energy of all battery modules of the power structured is balanced, the utilization of the battery module and the endurance of the large electric vehicle are increased to the largest extent. Moreover, by performing a battery box alternating-hibernation sorting process and recombining the internal series connection configuration of the configuration-variable series-type battery boxes, the discharging conditions of all battery modules are adjustable. Even if the battery modules are suffered from battery degradation and the stored energy difference is very large, the discharging conditions of all battery modules are adjusted according to the real-time dynamic information about the sorting result. Consequently, while the electric vehicle is driven, the residual electric energy quantities of all battery boxes of the power structure are substantially equal and the residual electric energy quantities of the battery modules in each battery box are substantially equal. Ideally, when the electric vehicle is returned to the charging station to be charged, the residual electric energy quantities of all battery modules are equal. Moreover, by performing a battery box alternating-hibernation sorting process and recombining the internal series connection configuration of the configuration-variable series-type battery boxes, the voltage of the battery module of any battery box will not be too low to enter the over-discharge protection state.

What is claimed is:

1. An alternating-hibernation battery management and control method for a power structure of a large electric vehicle, the power structure of the large electric vehicle comprising a vehicular computer with a sorting controller, plural configuration-variable series-type battery boxes in parallel connection and a driving device, each of the plural configuration-variable series-type battery boxes comprising plural battery modules in series connection, the alternating-hibernation battery management and control method comprising steps of:
   (a) the vehicular computer calculating a required number of battery modules and a required number of configuration-variable series-type battery boxes according to a vehicle-driving demand of the driving device;
   (b) the sorting controller calculating module scores of all battery modules, and generating a battery module sorting result of each configuration-variable series-type battery box;
   (c) the sorting controller enabling the required number of battery modules in each configuration-variable series-type battery box according to the required number of battery modules and the battery module sorting result of each configuration-variable series-type battery box;
   (d) the sorting controller calculating a battery box score of each configuration-variable series-type battery box according to the module scores of the enabled battery modules in each configuration-variable series-type battery box, and generating a battery box sorting result according to the battery box score; and
   (e) the sorting controller controlling at least one configuration-variable series-type battery box in the last rank of the battery box sorting result to be in a hibernation mode.

2. The alternating-hibernation battery management and control method for the power structure of the large electric vehicle according to claim 1, wherein in the step (a), the vehicular computer detects or forecasts a motor speed of the electric vehicle, calculates a DC bus voltage according to the motor speed, and determines the required number of battery modules according to the DC bus voltage.

3. The alternating-hibernation battery management and control method for the power structure of the large electric vehicle according to claim 1, wherein in the step (a), the vehicular computer detects or forecasts a motor torque of the electric vehicle, and determines the required number of configuration-variable series-type battery boxes according to the motor torque.

4. The alternating-hibernation battery management and control method for the power structure of the large electric vehicle according to claim 1, wherein in the step (b), the module score of each battery module is defined according to a state of charge, a state of health and/or a temperature information of the battery module.

5. The alternating-hibernation battery management and control method for the power structure of the large electric vehicle according to claim 1, wherein in the step (c), the battery module that is not enabled is further connected to a bypass loop.

6. The alternating-hibernation battery management and control method for the power structure of the large electric vehicle according to claim 1, wherein in the step (d), the module scores of the enabled battery modules in the step (c) are accumulated as the corresponding battery box score.

7. The alternating-hibernation battery management and control method for the power structure of the large electric vehicle according to claim 1, wherein in the step (e), at least one power transistor corresponding to the at least one configuration-variable series-type battery box in the last rank of the battery box sorting result is controlled to disconnect the configuration-variable series-type battery box from the driving device, so that the configuration-variable series-type battery box is in the hibernation mode.

8. The alternating-hibernation battery management and control method for the power structure of the large electric vehicle according to claim 1, further comprising a step of (f) performing a real-time dynamic update so as to trigger an alternating-hibernation switching process.

9. The alternating-hibernation battery management and control method for the power structure of the large electric vehicle according to claim 8, wherein in the step (f), the alternating-hibernation switching process is triggered at a predetermined time interval.

10. The alternating-hibernation battery management and control method for the power structure of the large electric vehicle according to claim 8, wherein in the step (f), the alternating-hibernation switching process is triggered according to a change amount of the battery box score.

11. The alternating-hibernation battery management and control method for the power structure of the large electric vehicle according to claim 8, wherein in the step (f), the alternating-hibernation switching process is triggered according to a change amount of the module score.

12. The alternating-hibernation battery management and control method for the power structure of the large electric vehicle according to claim 8, wherein in the step (f), the alternating-hibernation switching process is triggered according to a change amount of the vehicle-driving demand.

13. An alternating-hibernation battery management and control method for a power structure of a large electric vehicle, the power structure of the large electric vehicle comprising plural configuration-variable series-type battery boxes in parallel connection, each of the plural configuration-variable series-type battery boxes comprising plural battery modules in series connection, the alternating-hibernation battery management and control method comprising steps of:
   performing a battery module sorting process for sorting the battery modules of each configuration-variable series-type battery box to obtain a battery module sorting result, and allowing at least one battery module in the last rank of the battery module sorting result to be in a hibernation mode; and
   performing a battery box sorting process for sorting the plural configuration-variable series-type battery boxes to obtain a battery box sorting result, and allowing at least one configuration-variable series-type battery box in the last rank of the battery box sorting result to be in the hibernation mode.

14. The alternating-hibernation battery management and control method for the power structure of the large electric vehicle according to claim 13, wherein in the battery module sorting process, module scores of the battery modules of each configuration-variable series-type battery box are calculated, and the battery module sorting result of each configuration-variable series-type battery box is obtained according to the module scores.

15. The alternating-hibernation battery management and control method for the power structure of the large electric vehicle according to claim 14, wherein the module score of each battery module is defined according to a state of charge, a state of health and/or a temperature information of the battery module.

16. The alternating-hibernation battery management and control method for the power structure of the large electric vehicle according to claim 14, wherein in the battery box sorting process, battery box scores of the plural configuration-variable series-type battery boxes are calculated, and the battery box sorting result is obtained according to the battery box scores.

17. The alternating-hibernation battery management and control method for the power structure of the large electric vehicle according to claim 16, wherein the module scores of the enabled battery modules of each configuration-variable series-type battery box are accumulated as the corresponding battery box score.

18. The alternating-hibernation battery management and control method for the power structure of the large electric vehicle according to claim 13, wherein after the at least one battery module in the last rank of the battery module sorting result is connected to a bypass loop, the at least one battery module in the last rank of the battery module sorting result is in a hibernation mode.

19. The alternating-hibernation battery management and control method for the power structure of the large electric vehicle according to claim 13, wherein after the at least one configuration-variable series-type battery box in the last rank of the battery box sorting result is electrically disconnected through a corresponding power transistor, the at least one configuration-variable series-type battery box in the last rank of the battery box sorting result is in the hibernation mode.

20. A power structure of a large electric vehicle, the power structure comprising:
plural configuration-variable series-type battery boxes connected with each other in parallel, wherein each of the plural configuration-variable series-type battery boxes comprises plural battery modules, and the plural battery modules are connected with each other in series;
a driving device connected with the plural configuration-variable series-type battery boxes, wherein the driving device comprises a motor for driving the large electric vehicle and a motor drive for driving the motor; and
a vehicular computer connected with the plural configuration-variable series-type battery boxes for detecting a vehicle-driving demand of the driving device and calculating a required number of battery modules and a required number of configuration-variable series-type battery boxes, wherein the vehicular computer further comprises a sorting controller for performing a battery box alternating-hibernation sorting process, wherein while the battery box alternating-hibernation sorting process is performed, the battery modules of each configuration-variable series-type battery box are sorted to obtain a battery module sorting result, the required number of battery modules are enabled according to the battery module sorting result, the plural configuration-variable series-type battery boxes are sorted to obtain a battery box sorting result, and at least one configuration-variable series-type battery box in the last rank of the battery box sorting result is controlled to be in the hibernation mode.

21. The power structure of the large electric vehicle according to claim 20, wherein each configuration-variable series-type battery box further comprises a battery box monitoring board, wherein the battery box monitoring board is connected with the vehicular computer and the corresponding battery modules, and the battery box monitoring board receives a command from the vehicular computer so as to control the corresponding battery module.

22. The power structure of the large electric vehicle according to claim 20, wherein each battery module further comprises a battery module monitoring board, a battery core string, a relay and a bypass loop, wherein the relay is selectively connected with the battery core string or the bypass loop under control of the battery module monitoring board, so that the battery module is selectively in a power supply mode or the hibernation mode.

23. The power structure of the large electric vehicle according to claim 20, further comprising plural power transistors, wherein the plural power transistors are arranged between respective configuration-variable series-type battery boxes and the driving device, and the plural power transistors are connected with the vehicular computer, wherein according to a command from the vehicular computer, the corresponding power transistor controls the corresponding configuration-variable series-type battery box to be in the hibernation mode.

* * * * *